United States Patent
Babu et al.

(10) Patent No.: US 12,316,096 B2
(45) Date of Patent: May 27, 2025

(54) APPARATUS, SYSTEM, AND METHOD FOR POWER-CYCLING FIELD-REPLACEABLE UNITS REMOTELY

(71) Applicant: Juniper Networks, Inc., Sunnyvale, CA (US)

(72) Inventors: Balaji Babu, Sunnyvale, CA (US); David K. Owen, Sunnyvale, CA (US); Muhammad Sagarwala, Sunnyvale, CA (US); Nithin Shivalingappa, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 311 days.

(21) Appl. No.: 17/893,074

(22) Filed: Aug. 22, 2022

(65) Prior Publication Data

US 2024/0063632 A1 Feb. 22, 2024

(51) Int. Cl.
 *H02H 7/00* (2006.01)
 *H02H 1/00* (2006.01)
 *H02H 7/12* (2006.01)

(52) U.S. Cl.
 CPC ............ *H02H 7/12* (2013.01); *H02H 1/0007* (2013.01)

(58) Field of Classification Search
 None
 See application file for complete search history.

(56) References Cited

U.S. PATENT DOCUMENTS

| | | | |
|---|---|---|---|
| 5,627,413 A * | 5/1997 | Mughir | G06F 1/26 307/64 |
| 6,594,556 B1 * | 7/2003 | Agatstein | G06F 1/26 700/298 |
| 9,746,893 B1 | 8/2017 | Sizikov et al. | |
| 2014/0195859 A1 | 7/2014 | Dickenson et al. | |
| 2015/0370296 A1 * | 12/2015 | Purcell | G06F 11/221 714/43 |
| 2020/0257517 A1 | 8/2020 | Seater et al. | |

* cited by examiner

*Primary Examiner* — Stephen W Jackson
(74) *Attorney, Agent, or Firm* — Greenberg Traurig, LLP

(57) ABSTRACT

A disclosed apparatus may include (1) a voltage regulator module configured to convert electric power into at least one regulated voltage, (2) a controller configured to control passage of the electric power to the voltage regulator module, and (3) a computing device configured to (A) be powered by the regulated voltage and (B) provide a disable signal that causes the controller to suspend passage of the electric power to the voltage regulator module. Various other apparatuses, systems, and methods are also disclosed.

20 Claims, 5 Drawing Sheets

APPARATUS, SYSTEM, AND METHOD FOR POWER-CYCLING FIELD-REPLACEABLE UNITS REMOTELY

BACKGROUND

Power-cycling may have various purposes and/or benefits. For example, to complete certain firmware upgrades on conventional field-replaceable units, administrators may need to power-cycle the conventional field-replaceable units. Unfortunately, such power-cycling may require the administrators to be physically present at the location of the conventional field-replaceable units to turn off and/or disconnect the input power from the conventional field-replaceable units and then turn back on and/or reconnect the input power to the conventional field-replaceable units.

As a specific example, a conventional field-replaceable unit may be unable to restore its own input power without the physical presence of an administrator because the conventional field-replaceable unit is nonoperational while the power is turned off and/or disconnected. The instant disclosure, therefore, identifies and addresses a need for additional and improved apparatuses, systems, and methods for power-cycling field-replaceable units remotely.

SUMMARY

As will be described in greater detail below, the instant disclosure generally relates to apparatuses, systems, and methods for power-cycling field-replaceable units remotely. In one example, an apparatus for accomplishing such a task may include (1) a voltage regulator module configured to convert electric power into at least one regulated voltage, (2) a controller configured to control passage of the electric power to the voltage regulator module, and (3) a computing device configured to (A) be powered by the regulated voltage and (B) provide a disable signal that causes the controller to suspend passage of the electric power to the voltage regulator module.

Similarly, a system for accomplishing such a task may include (1) at least one power source and (2) at least one field-replaceable unit electrically coupled to the power source, wherein the field-replaceable unit comprises (A) a voltage regulator module configured to convert electric power provided by the power source into at least one regulated voltage, (B) a controller configured to control passage of the electric power to the voltage regulator module, and a computing device configured to (1) be powered by the regulated voltage and (II) provide a disable signal that causes the controller to suspend passage of the electric power to the voltage regulator module.

A corresponding method may include (1) electrically coupling a controller to a voltage regulator module configured to convert electric power supplied by a power source into at least one regulated voltage, (2) electrically coupling the power source to the controller to enable the controller to control passage of the electric power from the power source to the voltage regulator module, (3) electrically coupling the voltage regulator module to a computing device to facilitate powering the computing device via the regulated voltage, and (4) communicatively coupling the computing device to the controller to enable the computing device to provide a disable signal that causes the controller to suspend passage of the electric power to the voltage regulator module.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
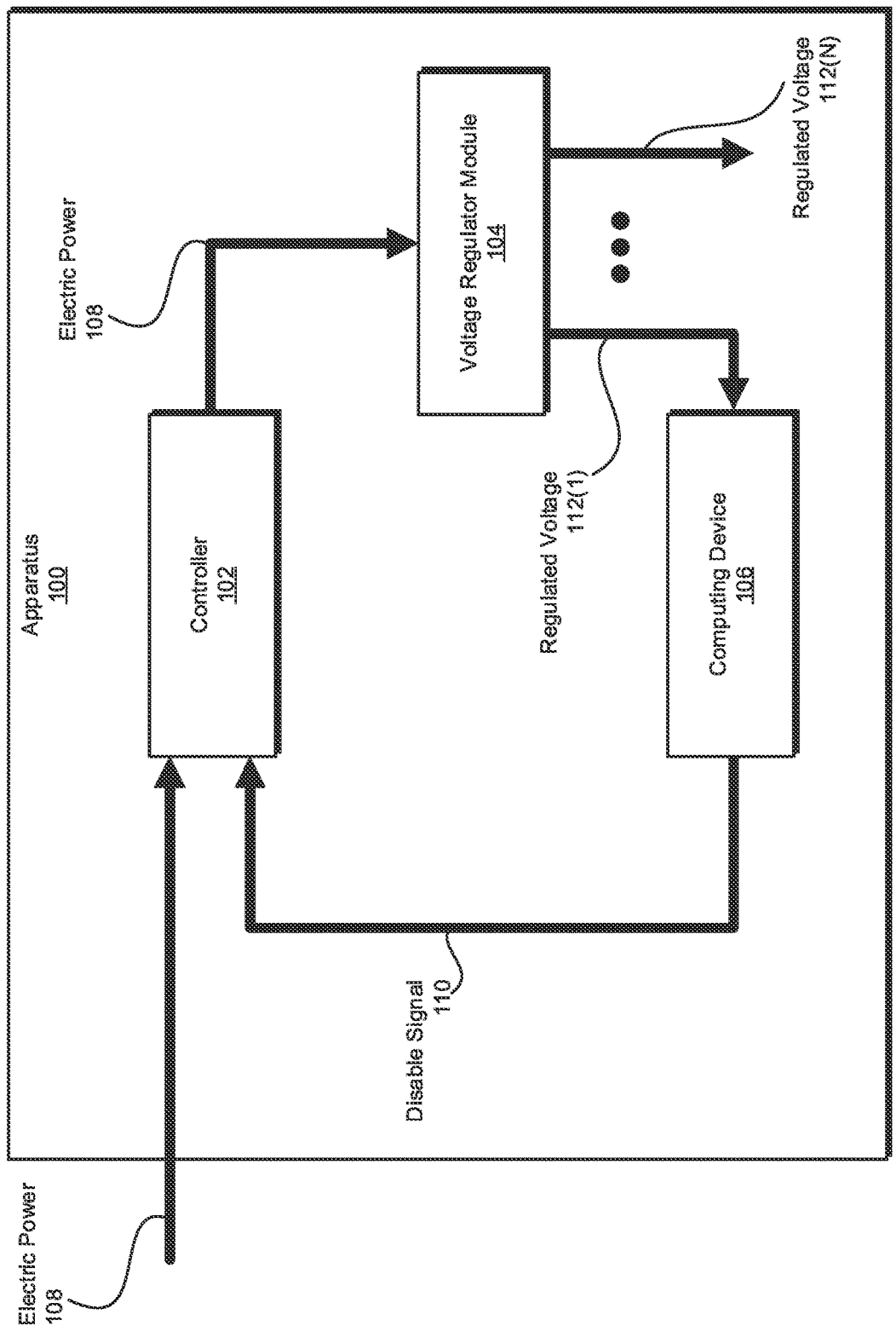
FIG. 1 is an illustration of an exemplary apparatus for power-cycling field-replaceable units remotely in accordance with one or more embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for power-cycling field-replaceable units remotely. As will be explained in greater detail below, embodiments of the instant disclosure may include and/or involve one or more features and/or components of a field-replaceable unit that facilitate toggling the input power to the field-replaceable unit. For example, a field-replaceable unit (such as a routing engine) may include and/or represent onboard circuitry and/or logic that directs a power controller to suspend passage of electric power and then restore passage of electric power after a certain amount of time. In this example, the onboard circuitry and/or logic may enable the field-replaceable unit to perform and/or execute remote power cycles to complete firmware upgrades on one or more devices, components, and/or features of the field-replaceable unit.

As a specific example, rather than being physically present at the location of a field-replaceable unit, an administrator may be able to transmit and/or send a software-based command that initiates a power cycle of the field-replaceable unit from a remote computing device. By doing so, the administrator may be able to manage and/or oversee firmware upgrades on a wider range of field-replaceable units, including those installed in network devices (e.g., routers) at remote locations. Additionally or alternatively, the administrator may be able to manage and/or oversee firmware upgrades on field-replaceable units located in faraway places, which would otherwise be impractical and/or infeasible. The administrator may also implement a remote power cycle on a field-replaceable unit that has frozen and/or is potentially malfunctioning for one reason or another. This remote power-cycling feature and/or option may help service providers save money and/or time in the administration of their devices across various locations.

In some examples, the term "power cycle" and/or the phrase "power-cycling" may refer to the process and/or act of cutting off or preventing the passage of electric power to some or all components on a power-consuming device (such as a field-replaceable unit) and subsequently restoring the passage of electric power to such components. In such examples, the term "power cycle" and/or the phrase "power-cycling" may be distinguished and/or contrasted from the term "reboot" and/or the phrase "rebooting", respectively. For example, the term "reboot" and/or the phrase "rebooting" may refer to the process and/or act of restarting some or all components on a power-consuming device while such components remain powered up and/or without necessarily cutting off or preventing the passage of electric power to such components.

The following will provide, with reference to FIGS. 1-4, detailed descriptions of exemplary components, apparatuses, systems, configurations, and/or implementations for power-cycling field-replaceable units remotely. In addition, the discussion corresponding to FIG. 5 will provide detailed descriptions of an exemplary method for assembling and/or manufacturing apparatuses for power-cycling field-replaceable units remotely.

FIG. 1 illustrates an exemplary apparatus 100 for power-cycling field-replaceable units remotely. In some examples, exemplary apparatus 100 may include and/or represent various features, components, and/or devices that make up and/or form part of a field-replaceable unit. For example, apparatus 100 may include and/or represent a controller 102, a voltage regulator module 104, and/or a computing device 106. In this example, controller 102 may be configured to control passage of electric power 108 from a power source (not necessarily illustrated in FIG. 1) to voltage regulator module 104.

In some examples, voltage regulator module 104 may be configured to convert electric power 108 into regulated voltages 112(1)-(N). In these examples, regulated voltages 112(1)-(N) may include and/or represent power or voltage buses of differing voltage levels (e.g., 3.3 volts, 5 volts, 12 volts, etc.). In one example, computing device 106 may be configured to be powered by regulated voltage 112(1). Additionally or alternatively, computing device 106 may generate, issue, and/or provide a disable signal 110 that causes controller 102 to suspend passage of electric power 108 to voltage regulator module 104.

In some examples, controller 102 may be electrically coupled between the power source and voltage regulator module 104. In one example, voltage regulator module 104 may be electrically coupled between controller 102 and computing device 106 and/or any number of additional computing devices powered by one or more of regulated voltages 112(1)-(N). Additionally or alternatively, computing device 106 may be electrically coupled to voltage regulator module 104, and/or computing device 106 may be communicatively coupled to controller 102 to facilitate the transmission of a disable signal 110 between computing device 106 and controller 102.

Upon suspension of the passage of electric power 108 at controller 102, voltage regulator module 104 may be temporarily unable to convert electric power 108 into regulated voltages 112(1)-(N). As a result, the levels of regulated voltages 112(1)-(N) may decrease and/or decline to zero volts for a certain amount of time. This decrease and/or decline of the levels of regulated voltages 112(1) may cause computing device 106 and/or any other electrical devices and/or components powered by one or more of regulated voltages 112(1)-(N) to completely shut and/or power down.

In some examples, once the necessary amount of time has expired and/or passed, controller 102 may restore and/or revive the passage of electric power 108 to voltage regulator module 104. Upon restoration of the passage of electric power 108 at controller 102, voltage regulator module 104 may again be able to convert electric power 108 into regulated voltages 112(1)-(N). As a result, regulated voltages 112(1)-(N) may increase and/or return to their previous, default, and/or original levels. This increase and/or return of the levels of regulated voltages 112(1) may cause and/or enable computing device 106 and/or any other electrical devices and/or components configured to draw power from one or more of regulated voltages 112(1)-(N) to power up and/or restore functionality or operability.

In some examples, such toggling (e.g., turning off and on) of electric power 108 at controller 102 may constitute, represent, and/or effectuate a power cycle of computing device 106 and/or any other electrical devices and/or components configured to be powered by one or more of regulated voltages 112(1)-(N). In such examples, this power-cycling may enable computing device 106 and/or any other electrical devices and/or components configured to be powered by one or more of regulated voltages 112(1)-(N) to complete and/or finalize a firmware upgrade without the need for on-site human interaction and/or intervention.

For example, computing device 106 may receive and/or install a firmware upgrade that necessitates a power cycle. In one example, the firmware upgrade may cause and/or trigger computing device 106 to generate, issue, and/or provide disable signal 110. In this example, computing device 106 may include and/or represent a complex programmable logic device (CPLD) and/or a field-programmable gate array (FPGA). Additionally or alternatively, controller 102 may include and/or represent a hot swap controller.

In some examples, computing device 106 may receive and/or detect a power-cycle command transmitted by a remote device (not necessarily illustrated in FIG. 1). In one example, the power-cycle command may cause and/or prompt computing device 106 to write certain data to a register. In this example, the data written to the register may cause and/or trigger the generation and/or issuance of disable signal 110. Disable signal 110 may cause and/or prompt controller 102 to toggle electric power 108 and/or cut off electric power 108 as part of a power cycle.

In some examples, apparatus 100 may include and/or represent one or more additional components, devices, features, and/or mechanisms that are not necessarily illustrated and/or labeled in FIG. 1. For example, apparatus 100 may also include and/or represent additional analog and/or digital circuitry, onboard logic, transistors, resistors, capacitors, diodes, inductors, switches, registers, flipflops, connections, traces, buses, semiconductor (e.g., silicon) devices and/or structures, storage devices, circuit boards, housings, combinations or variations of one or more of the same, and/or any other suitable components that facilitate power-cycling field-replaceable units remotely.

As a specific example, additional circuitry and/or onboard logic may reside and/or be applied or configured between computing device 106 and/or controller 102. In this example, the additional circuitry and/or onboard logic may be configured to draw electric power 108 directly from the power source. Additionally or alternatively, the additional circuitry and/or onboard logic may pass and/or forward disable signal 110 to controller 102 directly or indirectly. For example, disable signal 110 may cause and/or prompt the additional circuitry and/or onboard logic to disable and/or deactivate controller 102 via an electrical signal or response. In this example, the additional circuitry and/or onboard logic may also be configured to re-enable and/or reactivate controller 102 via an electrical signal or response after a certain amount of time has passed since disabling and/or deactivating controller 102.

In some examples, the additional circuitry and/or onboard logic may include and/or represent a delay circuit or a timer. In one example, the delay circuit and/or timer may be tuned to convert and/or transform disable signal 110 to an enable signal upon expiration of a certain amount of time. In this example, the certain amount of time may be sufficient to ensure that computing device 106 and/or any other relevant devices have fully powered down prior to the transformation of disable signal 110 into the enable signal. As a result, the delay circuit and/or timer may effectively power-cycle computing device 106 and/or any other relevant devices powered by regulated voltages 112(1)-(N). In other words, the transformation of disable signal 110 into the enable signal may cause controller 102 to restore the passage of electric power 108 to voltage regulator module 104, thereby completing a power cycle of computing device 106 and/or any other relevant devices powered by regulated voltages 112(1)-(N).

In one example, a delay circuit configured between computing device 106 and controller 102 may effectively delay the transformation of disable signal 110 back into the enable signal for a certain amount of time. Additionally or alternatively, a timer configured between computing device 106 and controller 102 may effectively track the amount of time disable signal 110 is maintained and/or held. In this example, once that amount of time reaches a certain threshold, the timer may cause circuitry between computing device 106 and controller 102 to transform and/or convert disable signal 110 to the enable signal.

In some examples, voltage regulator module 104 may be unable to convert electric power 108 into regulated voltages 112(1)-(N) while the passage of electric power 108 is suspended by controller 102. In such examples, voltage regulator module 104 may cease and/or stop such power conversion during the suspension. As a result, computing device 106 may be forced to power down due at least in part to voltage regulator module 104 ceasing such power conversion.

Figure 2:
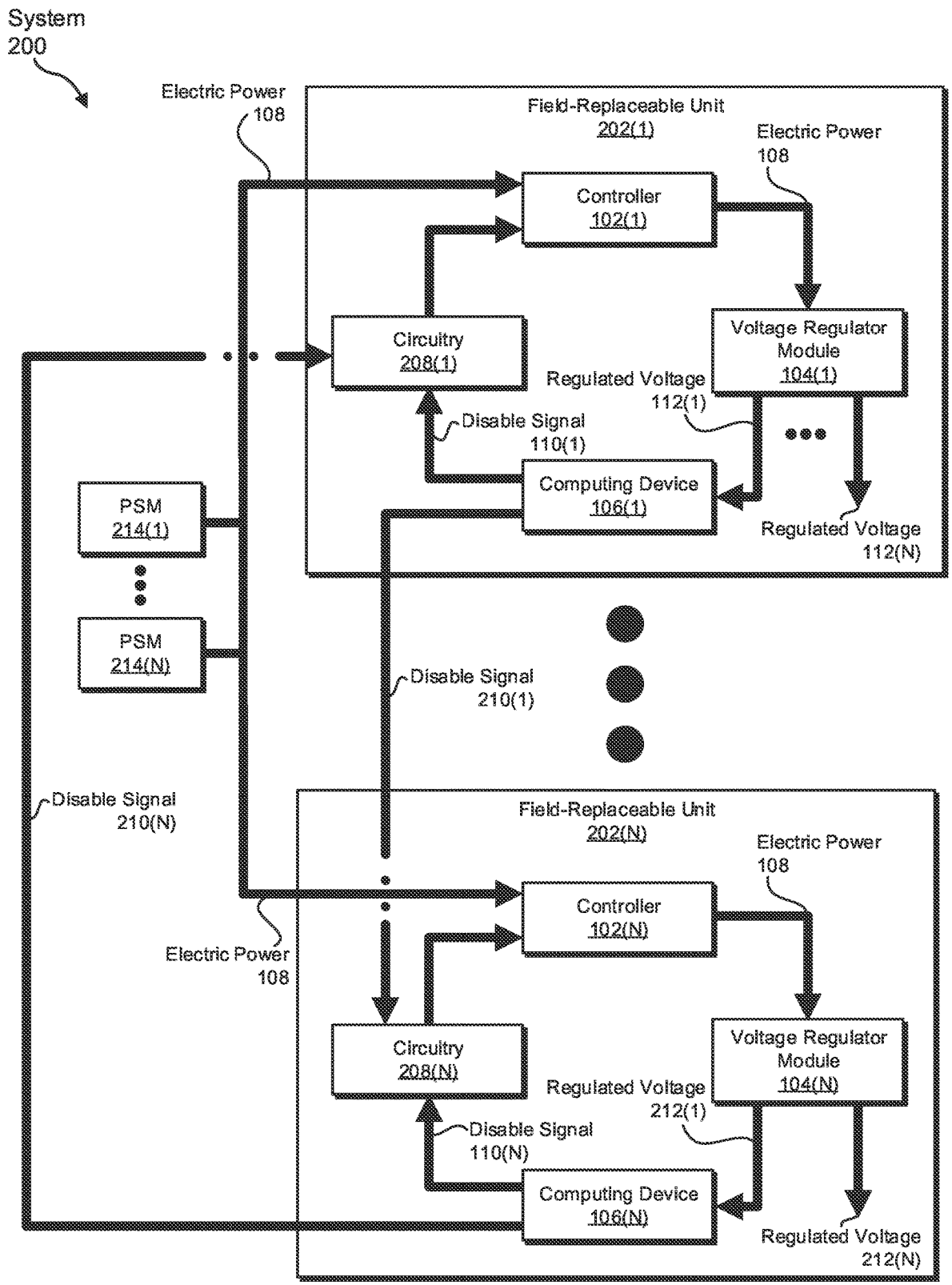
FIG. 2 is an illustration of an exemplary system for power-cycling field-replaceable units remotely in accordance with one or more embodiments of this disclosure.

FIG. 2 illustrates an exemplary system 200 for power-cycling field-replaceable units remotely. As illustrated in FIG. 2, exemplary system 200 may include and/or represent field-replaceable units 202(1)-(N) and power supply modules (PSMs) 214(1)-(N). In some examples, field-replaceable units 202(1)-(N) may be electrically coupled to PSMs 214(1)-(N). In such examples, PSMs 214(1)-(N) may supply and/or provide electric power 108 to field-replaceable units 202(1)-(N).

In some examples, field-replaceable unit 202(1) may include and/or represent a controller 102(1) electrically coupled between PSMs 214(1)-(N) and a voltage regulator module 104(1). In such examples, voltage regulator module 104(1) may be electrically coupled between controller 102(1) and a computing device 106(1) and/or any number of additional computing devices powered by one or more of regulated voltages 112(1)-(N). In one example, computing device 106(1) may be electrically coupled to voltage regulator module 104(1) via regulated voltage 112(1), and/or computing device 106(1) may be communicatively coupled to controller 102(1) via circuitry 208(1) that facilitates the transmission of a disable signal 110(1) between computing device 106(1) and controller 102(1). In this example, circuitry 208(1) may delay the transformation of disable signal 110(1) back into an enable signal for a certain amount of time.

Similarly, field-replaceable unit 202(N) may include and/or represent a controller 102(N) electrically coupled between PSMs 214(1)-(N) and a voltage regulator module 104(N). In such examples, voltage regulator module 104(N) may be electrically coupled between controller 102(N) and a computing device 106(N) and/or any number of additional computing devices powered by one or more of regulated voltages 212(1)-(N). In one example, computing device 106(N) may be electrically coupled to voltage regulator module 104(N) via regulated voltage 212(1), and/or computing device 106(N) may be communicatively coupled to controller 102(N) via circuitry 208(N) that facilitates the transmission of a disable signal 110(N) between computing device 106(N) and controller 102(N). In this example, circuitry 208(N) may delay the transformation of disable signal 110(N) back into an enable signal for a certain amount of time.

In some examples, computing device 106(1) may also be communicatively coupled to controller 102(N) via circuitry 208(N), which facilitates the transmission of a disable signal 210(1) between computing device 106(1) and controller 102(N). In such examples, circuitry 208(N) may delay the transformation of disable signal 210(1) back into an enable signal for a certain amount of time. In one example, disable signal 210(1) may cause controller 102(N) to suspend the passage of electric power 108 to voltage regulator module 104(N). Accordingly, computing device 106(1) may be able to power-cycle all or a portion of field-replaceable unit 202(N) (e.g., computing device 106(N)) if field-replaceable unit 202(N) gets stuck in a certain condition and/or experiences a potential failure.

In some examples, computing device 106(N) may also be communicatively coupled to controller 102(1) via circuitry 208(1), which facilitates the transmission of a disable signal 210(N) between computing device 106(N) and controller 102(1). In such examples, circuitry 208(1) may delay the transformation of disable signal 210(N) back into an enable signal for a certain amount of time. In one example, disable signal 210(N) may cause controller 102(1) to suspend the passage of electric power 108 to voltage regulator module 104(1). Accordingly, computing device 106(N) may be able to power-cycle all or a portion of field-replaceable unit 202(1) (e.g., computing device 106(1)) if field-replaceable unit 202(1) gets stuck in a certain condition and/or experiences a potential failure.

In some examples, computing device 106(1) may be configured to detect a potential failure (e.g., an unresponsive state, an error, an exception, etc.) experienced by field-replaceable unit 202(N). In response to detecting the potential failure, computing device 106(1) may issue and/or provide disable signal 210(1) to controller 102(N) via circuitry 208(N). In such examples, disable signal 210(1) may support, effectuate, and/or facilitate power-cycling all or a portion of field-replaceable unit 202(N). For example, disable signal 210(1) may cause field-replaceable unit 202(N)

to power-cycle an onboard CPLD and/or FPGA whose firmware is undergoing an upgrade.

Similarly, computing device 106(N) may be configured to detect a potential failure experienced by field-replaceable unit 202(1). In response to detecting the potential failure, computing device 106(N) may issue and/or provide disable signal 210(N) to controller 102(1) via circuitry 208(1). In such examples, disable signal 210(N) may support, effectuate, and/or facilitate power-cycling all or a portion of field-replaceable unit 202(1). For example, disable signal 210(N) may cause field-replaceable unit 202(1) to power-cycle an onboard CPLD and/or FPGA whose firmware is undergoing an upgrade.

In some examples, field-replaceable units 202(1)-(N) may generally refer to and/or represent any type or form of modular and/or removable device or component that facilitates and/or contributes to the flow of traffic within a network and/or across multiple networks. Examples of field-replaceable units 202(1)-(N) include, without limitation, routing engines, physical interface cards (PICs), flexible PIC concentrators (FPCs), switch interface boards (SIBs), control boards, routing engines, communication ports, fan trays, connector interface panels, portions of one or more of the same, combinations or variations of one or more of the same, and/or any other suitable field-replaceable units.

In some examples, circuitry 208(1) and/or 208(N) may include and/or represent any type or form of circuit, configuration, and/or device that forces a specific response and/or signal after a certain amount of delay. For example, circuitry 208(1) may pass and/or forward disable signal 110(1)—or a corresponding response or signal—to controller 102(1) to suspend the passage of electric power 108 for a certain amount of time. In this example, after having passed and/or forwarded disable signal 110(1) to controller 102(1), computing device 106(1) may power down, and circuitry 208(1) may force an enable signal to reach controller 102(1) after a certain amount of delay. By doing so, circuitry 208(1) may be able to toggle electric power 108 and/or ensure that computing device 106(1) is power-cycled, as computing device 106(1) cannot re-enable controller 102(1) alone due at least in part to being powered down.

Figure 3:
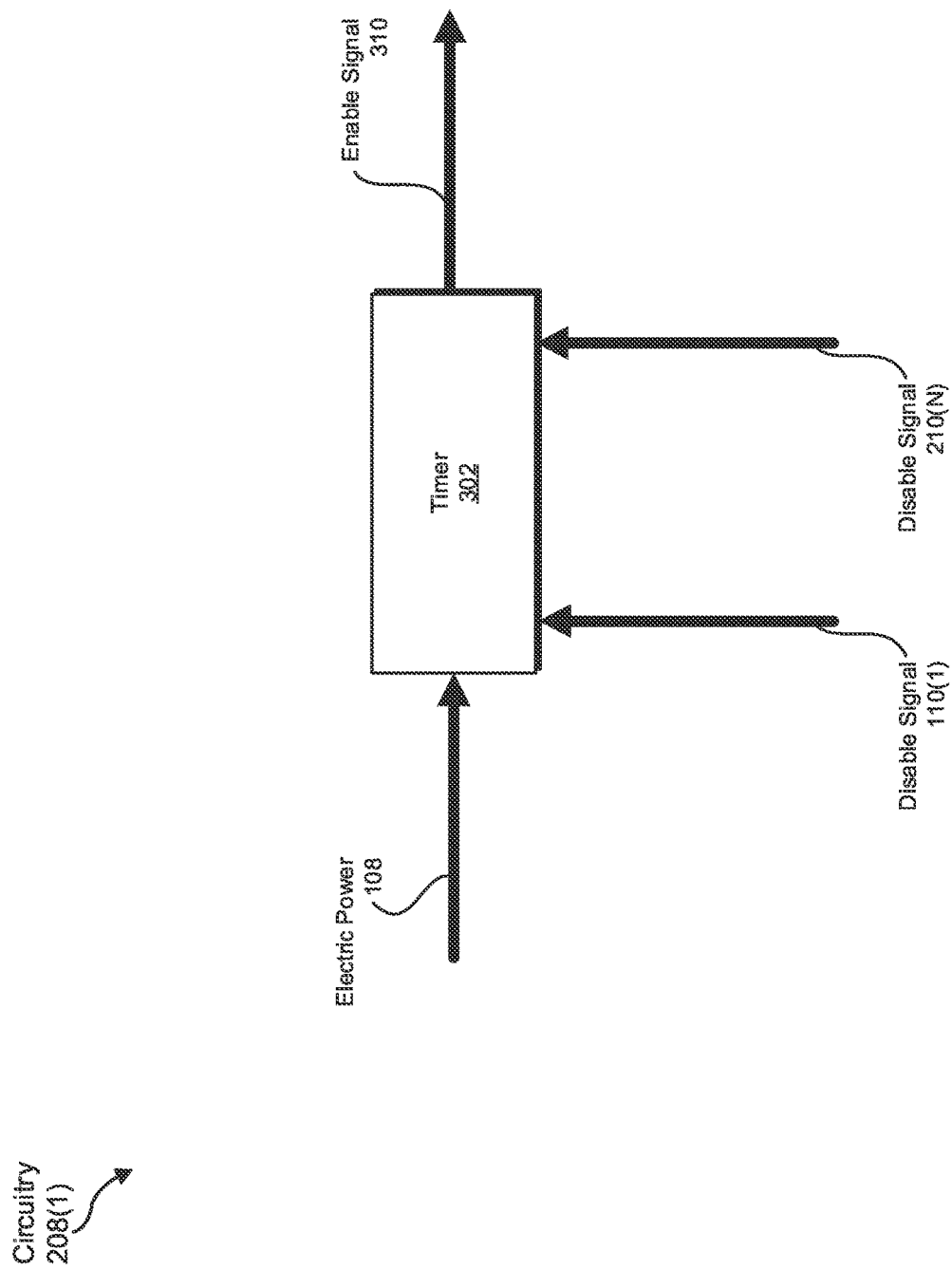
FIG. 3 is an illustration of an exemplary circuitry that facilitates power-cycling field-replaceable units remotely in accordance with one or more embodiments of this disclosure.

FIG. 3 illustrates an exemplary implementation of circuitry 208(1) that forces disable signal 210(1) and/or disable signal 210(N) to be converted and/or transformed into an enable signal 310 after a tunable delay. As illustrated in FIG. 3, exemplary circuitry 208(1) may include and/or represent a timer 302 powered by electric power 108. In some examples, timer 302 may remain powered up and/or on while controller 102(1) suspends the passage of electric power 108 to voltage regulator module 104(1). As a result, timer 302 may output and/or provide enable signal 310 to controller 102(1) after disable signal 110(1) or 210(N) caused controller 102(1) to suspend the passage of electric power 108 to voltage regulator module 104(1). In such examples, enable signal 310 may follow disable signal 110(1) or 210(N) after a certain amount of delay has transpired. In one example, the delay may constitute and/or represent enough time to fully power down computing device 106 and/or any number of additional components powered by one or more of regulated voltages 112(1)-(N).

In some examples, timer 302 may include and/or represent any type or form of device, component, and/or circuitry capable of producing an enable signal after a certain delay following a disable signal. Timer 302 may include and/or represent analog and/or digital circuitry, onboard logic, transistors, resistors, capacitors, diodes, inductors, switches, registers, flipflops, connections, traces, buses, semiconductor (e.g., silicon) devices and/or structures, storage devices, circuit boards, combinations or variations of one or more of the same, and/or any other suitable components that facilitate producing a delayed enable signal after a disable signal.

As a specific example, computing device 106(1) and/or circuitry 208(1) may be configured to provide and/or produce enable signal 310 as a default state, thereby causing controller 102(1) to support and/or facilitate the passage of electric power 108 to voltage regulator module 104(1) as a default state. In one example, computing device 106(1) may provide and/or produce disable signal 110(1) as part of and/or in conjunction with a firmware upgrade. In this example, circuitry 208(1) may carry and/or pass disable signal 110(1) to controller 102(1) to suspend the passage of electric power 108 until being subsequently re-enabled. Computing device 106(1) may be powered down during and as a result of this suspension.

Continuing with this example, circuitry 208(1) may be configured to maintain and/or hold disable signal 110(1) for a tunable amount of time (e.g., 1 second, 5 seconds, 10 seconds, 60 seconds, etc.). The amount of time may be tuned to ensure that onboard components in need of a power cycle are able to fully power down. After completion and/or expiration of that amount of time, circuitry 208(1) may restore enable signal 310 to re-enable controller 102(1) for the passage of electric power 108 even though computing device 106(1) is still powered down. The restoration of enable signal 310 may cause controller 102(1) to return and/or restore the passage of electric power 108 to voltage regulator module 104(1), thereby completing a power cycle of computing device 106(1) and/or any other components powered by one or more of regulated voltages 112(1)-(N).

In some examples, a disable signal may be represented and/or provided as a digital zero and/or a low-logic value or level. In such examples, an enable signal may be represented and/or provided as a digital one and/or a high-logic value or level. In alternative examples, a disable signal may be represented and/or provided as a digital one and/or a high-logic value or level. In such examples, an enable signal may be represented and/or provided as a digital zero and/or a low-logic value or level. In one example, the configuration of circuitry 208(1) may control and/or dictate whether the disable signal or the enable signal is a digital zero or a digital one.

Figure 4:
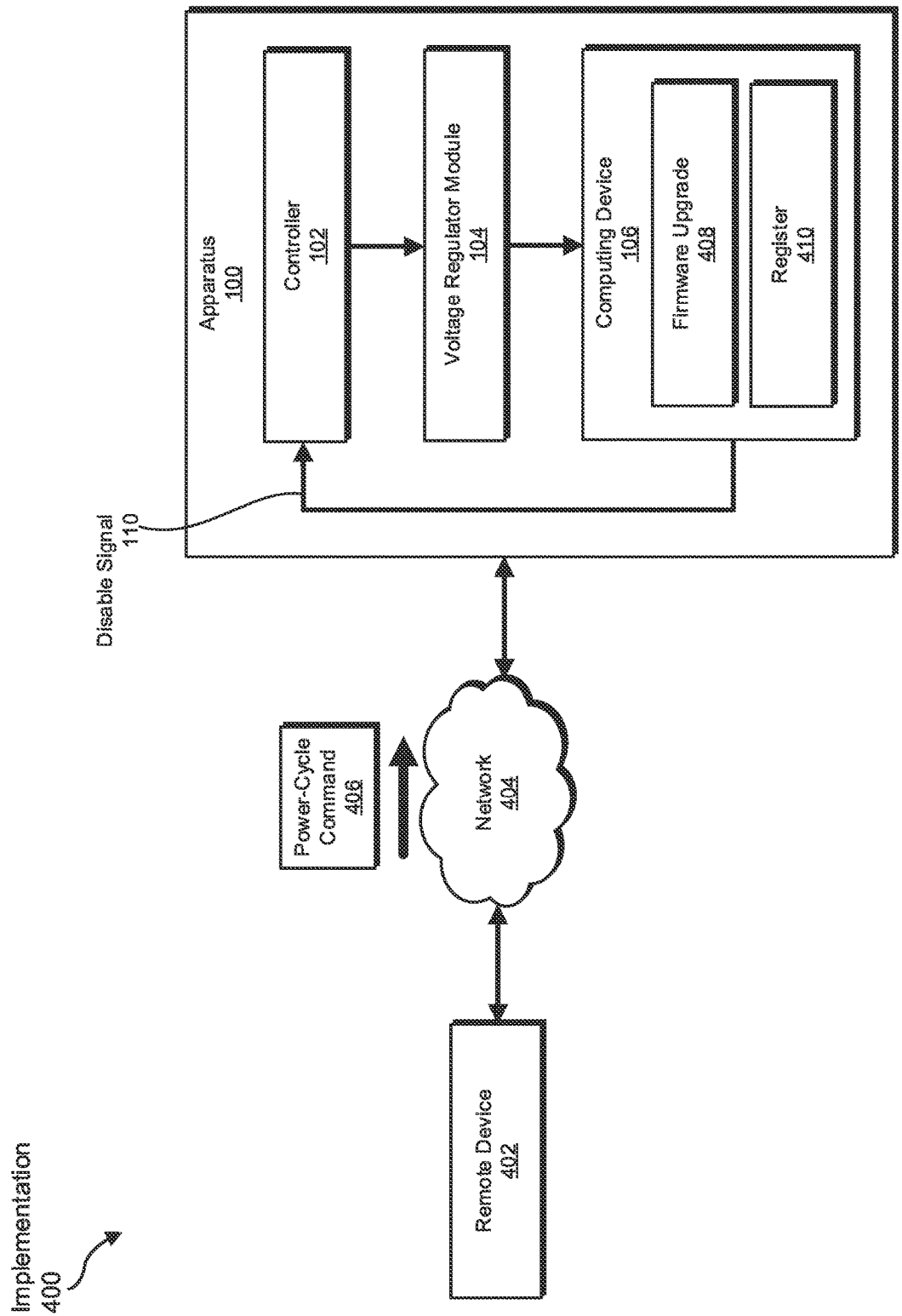
FIG. 4 is an illustration of an exemplary implementation of an apparatus for power-cycling field-replaceable units remotely in accordance with one or more embodiments of this disclosure.

FIG. 4 illustrates an exemplary implementation 400 of apparatus 100 in which apparatus 100 is communicatively coupled to a remote device 402 via a network 404. As illustrated in FIG. 4, remote device 402 may transmit and/or send a power-cycle command 406 to apparatus 100 via network 404. In some examples, power-cycle command 406 may be transmitted and/or sent to apparatus 100 in connection with a firmware upgrade 408 installed to computing device 106. In other examples, an administrator operating remote device 402 may direct and/or cause remote device 402 to transmit and/or send power-cycle command 406 to apparatus 100 in connection with firmware upgrade 408 or as a stand-alone instruction or operation.

In some examples, power-cycle command 406 may direct computing device 106 to write data to a register 410. In such examples, writing this data to register 410 may cause computing device 106 to issue disable signal 110. In other words, writing this data to register 410 may trigger the issuance of disable signal 110. In one example, disable signal 110 may cause controller 102 to suspend the passage of electric power to voltage regulator module 104 to facilitate power-cycling computing device 106. In this example, power-cycling computing device 106 in this way may enable computing device 106 to implement and/or complete firmware upgrade 408.

In some examples, network 404 may include and/or represent any medium and/or architecture capable of facilitating communication and/or data transfer between remote device 402 and apparatus 100. In one example, network 204 may include remote device 402 and/or apparatus 100 even though remote device 402 and apparatus 100 are illustrated as being external to network 404 in FIG. 4. Additionally or alternatively, network 404 may include other devices that facilitate communication between remote device 402 and/or apparatus 100. Network 404 may facilitate communication or data transfer using wireless and/or wired connections. Examples of network 404 include, without limitation, an intranet, an access network, a layer 2 network, a layer 3 network, a multiprotocol label switching (MPLS) network, an Internet protocol (IP) network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

In some examples, remote device 402 may include and/or represent any type or form of physical computing device capable of reading computer-executable instructions, handling network traffic, and/or sending power-cycle commands. Examples of remote device 402 include, without limitation, routers (such as a transit label switching router, a label edge router, a provider edge router, a hub router, a spoke router, an autonomous system boundary router, and/or an area border router), switches, hubs, modems, bridges, repeaters, gateways (such as broadband network gateways (BNGs)), multiplexers, network adapters, network interfaces, linecards, collectors, client devices, laptops, tablets, desktops, servers, cellular phones, personal digital assistants (PDAs), multimedia players, embedded systems, wearable devices, gaming consoles, portions of one or more of the same, variations or combinations of one or more of the same, and/or any other suitable devices.

Figure 5:
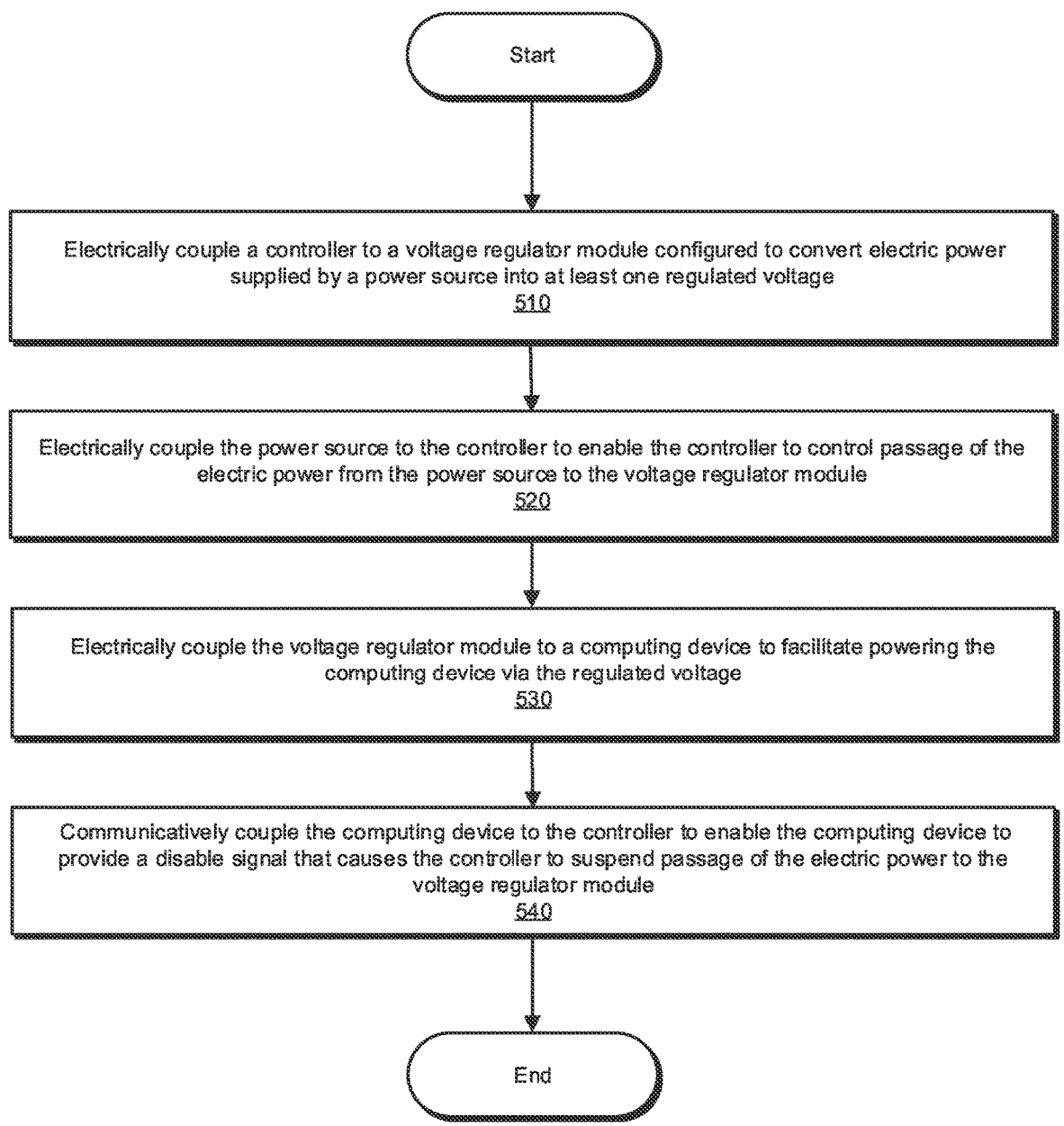
FIG. 5 is a flow diagram of an exemplary method for power-cycling field-replaceable units remotely in accordance with one or more embodiments of this disclosure.

FIG. 5 is a flow diagram of an exemplary method 500 for assembling and/or manufacturing an apparatus for power-cycling field-replaceable units remotely. Method 500 may include the step of electrically coupling a controller to a voltage regulator module configured to convert electric power supplied by a power source into at least one regulated voltage (510). Step 510 may be performed in a variety of ways, including any of those described above in connection with FIGS. 1-4. For example, a computing equipment manufacturer or subcontractor electrically couple a hot swap controller to a voltage regulator module configured to convert and/or transform electric power supplied by a power source into at least one regulated voltage.

Method 500 may also include the step of electrically coupling the power source to the controller to enable the controller to control passage of the electric power from the power source to the voltage regulator module (520). Step 520 may be performed in a variety of ways, including any of those described above in connection with FIGS. 1-4. For example, a computing equipment manufacturer or subcontractor may electrically couple one or more PSMs to the hot swap controller to enable the hot swap controller to control passage of the electric power from the power source to the voltage regulator module.

Method 500 may further include the step of electrically coupling the voltage regulator module to a computing device to facilitate powering the computing device via the regulated voltage (530). Step 530 may be performed in a variety of ways, including any of those described above in connection with FIGS. 1-4. For example, a computing equipment manufacturer or subcontractor may electrically couple the voltage regulator module to a CPLD to facilitate powering the CPLD via the regulated voltage.

Method 500 may additionally include the step of communicatively coupling the computing device to the controller to enable the computing device to provide a disable signal that causes the controller to suspend passage of the electric power to the voltage regulator module (540). Step 540 may be performed in a variety of ways, including any of those described above in connection with FIGS. 1-4. For example, a computing equipment manufacturer or subcontractor may communicatively couple the CPLD to the hot swap controller to enable the CPLD to provide a disable signal that causes the hot swap controller to suspend passage of the electric power to the voltage regulator module. In one example, the hot swap controller, the voltage regulator module, and/or the CPLD may be incorporated and/or packaged as part of a routing engine for a router.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
a voltage regulator module configured to convert electric power into at least one regulated voltage;
a controller configured to control passage of the electric power to the voltage regulator module; and
a computing device configured to:
be powered by the regulated voltage; and
provide a disable signal that causes the controller to suspend passage of the electric power to the voltage regulator module.

2. The apparatus of claim 1, wherein the computing device is further configured to:
receive a power-cycle command transmitted by a remote device; and
issue the disable signal in response to the power-cycle command.

3. The apparatus of claim 2, wherein the power-cycle command causes the computing device to write data to a register that triggers the issuance of the disable signal.

4. The apparatus of claim 2, wherein the computing device is configured to install a firmware upgrade that necessitates a power cycle prior to issuing the disable signal.

5. The apparatus of claim 1, wherein the controller is further configured to:
suspend passage of the electric power to the voltage regulator module in response to the disable signal; and
maintain the suspension of the electric power until the disable signal transforms into an enable signal.

6. The apparatus of claim 5, wherein the controller is further configured to restore passage of the electric power to the voltage regulator module upon transformation of the disable signal to the enable signal to complete a power cycle of at least one power-consuming device.

7. The apparatus of claim 6, further comprising circuitry that delays the transformation of the disable signal to the enable signal for a certain amount of time.

8. The apparatus of claim 7, further comprising a timer configured to track the certain amount of time and cause the controller to restore passage of the electric power upon expiration of the certain amount of time.

9. The apparatus of claim 6, wherein the power-consuming device comprises at least one of:
the computing device;
a field-replaceable unit that incorporates the voltage regulator module, the controller, and the computing device; or
a field-replaceable unit remote from the computing device.

10. The apparatus of claim 1, wherein:
the voltage regulator module is further configured to cease converting the electric power into the regulated voltage while passage of the electric power is suspended by the controller; and
the computing device is further configured to power down due at least in part to the voltage regulator module ceasing conversion of the electric power into the regulated voltage.

11. The apparatus of claim 1, further comprising:
a field-replaceable unit that incorporates the voltage regulator module, the controller, and the computing device; and
an additional field-replaceable unit comprising:
an additional voltage regulator module configured to convert the electric power into at least one additional regulated voltage;
an additional controller configured to control passage of the electric power to the additional voltage regulator module; and
an additional computing device configured to:
be powered by the additional regulated voltage; and
provide an additional disable signal that causes the additional controller to suspend passage of the electric power to the additional voltage regulator module.

12. The apparatus of claim 11, wherein:
the computing device is further configured to provide the additional disable signal that causes the additional controller to suspend passage of the electric power to the additional voltage regulator module; and
the additional computing device is further configured to provide an alternative disable signal that causes the controller to suspend passage of the electric power to the voltage regulator module.

13. The apparatus of claim 11, wherein the computing device is further configured to:
detect a potential failure experienced by the additional field-replaceable unit; and
in response to detecting the potential failure, issues the additional disable signal to power cycle the additional field-replaceable unit.

14. The apparatus of claim 1, wherein the computing device comprises at least one of:
a complex programmable logic device; or
a field-programmable gate array.

15. A system comprising:
at least one power source; and
at least one field-replaceable unit electrically coupled to the power source, wherein the field-replaceable unit comprises:
a voltage regulator module configured to convert electric power provided by the power source into at least one regulated voltage;
a controller configured to control passage of the electric power to the voltage regulator module; and
a computing device configured to:
be powered by the regulated voltage; and
provide a disable signal that causes the controller to suspend passage of the electric power to the voltage regulator module.

16. The system of claim 15, wherein the computing device is further configured to:
receive a power-cycle command transmitted by a remote device; and
issue the disable signal in response to the power-cycle command.

17. The system of claim 16, wherein the power-cycle command causes the computing device to write data to a register that triggers the issuance of the disable signal.

18. The system of claim 16, wherein the computing device is configured to install a firmware upgrade that necessitates a power cycle prior to issuing the disable signal.

19. The system of claim 15, wherein the controller is further configured to:
suspend passage of the electric power to the voltage regulator module in response to the disable signal; and
maintain the suspension of the electric power until the disable signal transforms into an enable signal.

20. A method comprising:
electrically coupling a controller to a voltage regulator module configured to convert electric power supplied by a power source into at least one regulated voltage;

electrically coupling the power source to the controller to enable the controller to control passage of the electric power from the power source to the voltage regulator module;

electrically coupling the voltage regulator module to a computing device to facilitate powering the computing device via the regulated voltage; and communicatively coupling the computing device to the controller to enable the computing device to provide a disable signal that causes the controller to suspend passage of the electric power to the voltage regulator module.

\* \* \* \* \*